United States Patent [19]

Miranday et al.

[11] 4,328,318

[45] May 4, 1982

[54] GLASSES CONTAINING FLUORINE, THEIR PREPARATION AND THEIR APPLICATION

[75] Inventors: Jean-Pierre Miranday, Le Mans; Charles Jacoboni, Sainte Jamme; Robert de Pape, Le Mans, all of France

[73] Assignee: Agence Nationale de Valorisation de la Recherche (ANVAR), Paris, France

[21] Appl. No.: 132,169

[22] Filed: Mar. 20, 1980

[30] Foreign Application Priority Data

Mar. 28, 1979 [FR] France .............................. 79 07785

[51] Int. Cl.³ .................................................. C03C 3/12
[52] U.S. Cl. ..................................... 501/40; 252/62.57; 252/62.63; 252/301.4 F; 252/301.4 H; 350/96.34; 350/1.3; 350/1.4; 501/43; 501/44; 501/903; 501/904; 501/900
[58] Field of Search .......................... 106/47 Q, 47 R; 350/96.34, 1.3, 1.4; 252/301.4 F, 301.4 H; 501/40, 43, 44, 903, 904, 900

[56] References Cited

U.S. PATENT DOCUMENTS

| | | | |
|---|---|---|---|
| 2,466,507 | 4/1949 | Sun et al. ........................... | 106/47 R |
| 3,709,827 | 1/1973 | Auzel .............................. | 252/301.4 H |
| 4,040,846 | 8/1977 | Broemer et al. .................. | 106/47 Q |
| 4,120,814 | 10/1978 | Izumitani et al. ............. | 106/47 Q X |
| 4,141,741 | 2/1979 | Lucas et al. ..................... | 106/47 Q |

FOREIGN PATENT DOCUMENTS

2396981  3/1979  France .............................. 350/96.34

OTHER PUBLICATIONS

Leidtorp, R. A. "Vitrification and Crystallization Capacity of $BaPO_3F-AlF_3(GaF_3)(Li,Na,K,Zn,Cd,Pb)F_2$ Glasses" Izv. Akad. Nauk. SSSR, Neorg. Mater. 1972, 8 (11) pp. 2053-2054.

*Primary Examiner*—Helen M. McCarthy
*Attorney, Agent, or Firm*—Brisebois & Kruger

[57] ABSTRACT

Glasses containing fluorine. These glasses are characterized by the fact that they contain at least 25% in moles, approximately, of a fluoride or a mixture of fluorides $MX(X_1)_2$, in which:

X and $X_1$ each represent a fluorine atom, and M then represents a metal chosen from among the group consisting of gallium, iron, chromium, vanadium, indium, and the rare earths, or X represents an oxygen atom, $X_1$ represents a fluorine atom, and M then represents a titanium atom, it being understood that the said glasses contain no hydrofluoric acid as a network former and that, in the case in which M represents a gallium or indium atom, the glasses do not contain more than 15% in moles of $BaPO_3F$.

Application notably in obtaining glasses containing various cations conferring particular optical or magneto-optical properties.

23 Claims, No Drawings

GLASSES CONTAINING FLUORINE, THEIR PREPARATION AND THEIR APPLICATION

The present invention has as its object new glasses containing fluorine, their preparation and their application.

It is known that certain chemical compounds, because of their structure, allow the formation of glasses, alone or associated with other constituents; this is the case with silica and certain fluorides such as $BeF_2$, $ZrF_4$, $HfF_4$, or $AlF_3$, or also $BaPO_3F$.

Such glasses, containing fluorine with the above mentioned fluorides as necessary constituents have been described particularly in French patent applications 919.006, 73.15318, 73.23903, 76.18878, and 77.09618. These glasses often contain at least three or four necessary constituents.

On the other hand, the resume article in Chemical Abstracts Vol. 78, No. 8, page 225, 47046v (1973) mentions glasses with a base of $BaPO_3F$, which may contain diverse fluorides such as $AlF_3$, $GaF_3$, $InF_3$, $CdF_2$, $ZnF_2$, $PbF_2$, the alkaline fluorides, etc. . . . These glasses always contain more than 15% in moles of $BaPO_3F$.

Finally, it should be noted that the formation of glasses with a base of metallic fluorides and hydrofluoric acid has been mentioned in the literature. However, it is stated that the products formed were not glasses.

The new glasses of the present invention containing fluorine, give ternary and even binary vitrifiable combinations.

The glasses of the invention containing fluorine can be prepared at relatively low temperatures, except in the case in which they contain fluorides of rare earths in large proportions.

Another advantage of the new glasses of the invention containing fluorine resides in the possibility of including in them, as a constituent, a significant proportion, which may go as high as about 40%, of fluorides of 3d bivalent transition elements. The glasses containing fluorine of the invention also allow the introduction of alkaline ions.

These properties distinguish the glasses containing fluorine of the invention from glasses with a base of aluminum trifluoride, because the introduction of alkaline ions or the introduction of bivalent ions of 3d transition metals cannot be carried out starting with formulations with a base of aluminum trifluoride.

Thus it has not been possible to obtain glasses of the systems $PbF_2$-$AlF_3$, $NaF$-$PbF_2$ (or $SrF_2$)-$AlF_3$, and $PbF_2$-$MnF_2$ (or $CuF_2$)-$AlF_3$.

These characteristics of glasses containing fluorine of the invention, linked to the transparency properties in the infrared belonging to halides, give them interesting properties and permit their use particularly in the fields of optics, magnetism, or magneto-optics. Their refraction index and their dispersion index are different from those of known glasses containing fluorine.

It is possible to make with these glasses materials which transmit the infrared up to 12 microns but contingently stop the visible radiations. The introduction into these glasses of cations, for example of chromium, or of rare earths such as neodymium and europium, confer on them luminescent properties. The introduction of cadmium allows the manufacture of glasses having properties of anti-neutron screens. The introduction of alkaline ions and of transition metal ions confers to them electrical properties for ionic conduction due for example to ions $Ag^\oplus$, $Na^\oplus$, $Li^\oplus$.

Moreover, the introduction of transition metals allows, on the one hand, the production of colored glasses, because the transition metals have absorption bands in the visible range, and on the other hand confer to the glasses magneto-optic properties because the transition metals have an incomplete 3d electron layer allowing magnetism.

It should be noted that the glasses containing fluorine of the invention are distinguished by their refraction indices, their dispersion indices, and by the fact that they are transparent even for relatively long infrared wave lengths.

The glasses containing fluorine presently known, formed by the combination of metallic fluorides, always have a large proportion of a favored constituent called former (in English "network former") such as those mentioned above.

The present invention has as its object new fluorine glasses containing, as a network former element at least about 25% in moles, of a fluoride or a mixture of fluorides of the formula $MX(X_1)_2$, in which:

X and $X_1$ each represent a fluorine atom, and M then represents a metal selected from the group consisting of gallium, iron, chromium, vanadium, indium, and the rare earths, or X represents an oxygen atom, $X_1$ represents a fluorine atom, and M then represents a titanium atom, it being understood that the glasses do not have any hydrofluoric acid as a network former element and that, in the case in which M represents a gallium or indium atom, the glasses do not contain more than 15% in moles of $BaPO_3F$.

Among these glasses containing fluorine can be cited as of particular interest those which also contain at least one fluoride of the formula $M_{II}F_2$, $M_{II}$ being a divalent metal selected from the group consisting of lead, barium, calcium, cadmium and strontium. These glasses contain up to 75% in moles, approximately, of fluoride or a mixture of $M_{II}F_2$ fluorides.

Among the glasses containing fluorine according to the above definitions may also be cited those which in addition contain at least one fluoride of formula $MtF_2$, Mt being a 3d transition metal. The Mt metal is especially chosen from among the group consisting of cobalt, copper, manganese, iron, chromium, nickel, and zinc. These glasses can contain generally up to about 40% in moles, of fluoride or of a mixture of $MtF_2$ fluorides.

The different types of glasses defined above can also contain at least one fluoride of formula $M_IF$, $M_I$ being selected from the group consisting of the alkaline metals and silver. These glasses generally contain up to about 50% in moles of fluoride or a mixture of $M_IF$ fluorides. As indicated above, the introduction of the $M_IF$ fluoride allows the glasses of the present invention to take on electrical properties. On the other hand, the introduction of a monovalent fluoride or of a mixture of monovalent fluorides allow the fusion temperature of the mixture to be lowered and improves the stability of the glass because it increases the disorder of the ions in the liquid state. Moreover, the introduction of the monovalent fluoride assists the formation of glasses containing $M_{II}F_2$ fluorides mentioned above, especially those which have no lead. When the glasses of the invention contain fluorides of rare earths, these fluorides are for example those of the following rare earths: neodymium, gadolinium, europium, holmium, praseodymium, erbium, etc. . . .

The glasses containing fluorine of the present invention may also contain, in addition, one or several adjuvants such as:
- bismuth trifluoride, preferably up to about 22% in moles;
- one or several halides (other than fluorides) and especially chlorides, in particular those of the metals cited above, and especially, those of $M_{II}$ and $M_I$ metals, such as for example $PbCl_2$, up to about 10% in moles;
- phosphoric anhydride $P_2O_5$, generally up to 15% in moles;
- alkaline or alkaline earth fluorophosphates. Among these glasses will be mentioned those which do not contain more than 15%, those which do not contain more than 10%, and those which do not contain more than 5% in moles, of alkaline earth fluorophosphates, and in particular $BaPO_3F$, especially in the case in which M represents gallium or indium; of course the glasses of the invention can be devoid of fluorophosphates, especially alkaline earth, and in particular may not contain any $BaPO_3F$;
- $AlF_3$, $ZrF_4$, or $HfF_4$, generally up to about 10% in moles; of course the glasses of the invention can be devoid of these constituents or any particular one of them.

The glasses of the invention may also contain by way of additives oxides, especially metallic oxides. Moreover, the glasses containing fluorine of the invention preferably do not contain any beryllium fluoride or magnesium fluoride.

Among the glasses containing fluorine of the invention, the following glasses may be cited in particular, which are characterized by the fact that they contain:
- 25 to 30% in moles, approximately, of fluoride or a mixture of fluorides $MX(X_1)_2$, the rest consisting of a fluoride or a mixture of fluorides $M_{II}F_2$;
- 48 to 55% in moles, approximately, of fluorides or a mixture of fluorides $MX(X_1)_2$, the rest consisting of a fluoride or a mixture of fluorides $M_{II}F_2$;
- 25 to 50% in moles, approximately, of fluoride or a mixture of fluorides $MX(X_1)_2$, 20 to 60% in moles, approximately, of fluoride or a mixture of fluorides $M_{II}F_2$, the rest consisting of a fluoride or a mixture of fluorides $MtF_2$, this latter being present at a ratio of less than about 40% in moles;
- 37 to 50% in moles, approximately, of fluoride or a mixture of fluorides $MX(X_1)_2$, 10 to 55% in moles, approximately of fluoride or a mixture of fluorides $M_{II}F_2$, the rest consisting of a fluoride or a mixture of fluorides $M_IF$, this latter being present at a ratio of less than 50% in moles;
- 25 to 50% in moles, approximately, of a fluoride or a mixture of fluorides $MX(X_1)_2$, 10 to 60%, approximately, of a fluoride or a mixture of fluorides $M_{II}F_2$, up to 50% in moles, approximately, of a fluoride or a mixture of fluorides $M_IF$, the rest consisting of a fluoride or a mixture of fluorides $MtF_2$ present at a ratio of 40% in moles, approximately, as a maximum.

Among the glasses of the invention, those in which M represents iron, chromium, vanadium, and the rare earths can be cited in particular.

Among the glasses of the invention can also be cited those containing up to 12% in moles of trifluorides of rare earths, it being understood that, in this case, the glasses necessarily contain other fluorides $MX(X_1)_2$, such as those defined above (but in which M is not a rare earth), to arrive at least at the proportion of 25% in moles of the total.

Among the glasses of the invention can also be cited those which consist entirely of the various fluorides (or oxyfluorides) mentioned above possibly combined with other metallic halides.

Glasses containing at least one fluoride $MtF_2$ in which Mt is chosen from among the group consisting of cobalt, copper, manganese, iron, nickel, and zinc, can also be cited.

One can also mention glasses containing fluorine of the invention with bases of the following fluorides:
- $M=Fe$; $Mt=Cu$; $M_{II}=Pb$;
- $M=Cr$; $Mt=Mn$; $M_{II}=Pb$.

The properties of these latter glasses are discussed below.

The glasses of the present invention are easily cut and generally highly resistant to ambient humidity. They may be safely heated in air or under an atmosphere of hydrofluoric acid from 200° C. to 400° C. according to the vitreous transition temperatures. They may be used, generally, in installations, containers, etc . . . , which may be in contact with products such as fluorine or hydrofluoric acid.

The samples are transparent from 250 nm to 8,000 nm and even up to 12,000 nm for those which do not contain any alkaline fluorides. They clearly present the absorption bands characteristic of the transition elements making up the glass studied and can be rendered opaque for certain wavelengths. The inclusion of neodymium and/or europium, for example, confers significant luminescent properties.

The optical properties of the glasses of the invention allow them to be used particularly in optical devices, especially in the infrared region, and also allow them to be used in the fabrication of optical fibers.

Certain ions, especially the ions $Fe^{3\oplus}$, $Co^{2\oplus}$, $Ni^{2\oplus}$, $Cr^{3\oplus}$, $Cu^{2\oplus}$, $Fe^{2\oplus}$, and $Mn^{2\oplus}$, confer, when they are present, magnetic properties. These glasses have a magnetic nature at low temperatures which associated with their isotropy and their perfect transparency gives them magneto-optical properties such as those exhibited by certain crystallized iron fluorides.

Finally, certain of these glasses and particularly those with a base of Pb-Cu-Fe or of Pb-Mn-Cr have good metal adherence properties and thus may serve as protective coatings for metallic objects.

The glasses of the invention may be prepared by mixing the constituents then melting the mixture of fluorides under a dry neutral atmosphere. The liquid glass obtained may then be treated according to the usual methods to give it the desired shape. For example, it may be poured into a mold or shaped with a cylindrical roller or flattened between two cylindrical rollers turning at high speed, or even spun.

The preparation of the glasses generally takes place in a glove box. The mixtures of fluorides are heated in a flat (platine) crucible, preferably at a temperature greater than about 100° to 200° C. above the point of fusion of the mixture. These points of fusion, which vary with the composition of the said mixture, generally fall between about 480° and 800° C. (except in the case of fluorides having significant quantities of rare earths) and are often lower than 650° C.

The liquid glass obtained may for example be poured into a brass mold preheated to a temperature of about 150° to 300° C., or shaped with a cylindrical roller on a polished surface.

The glasses of the present invention may also be produced after mixture of the constituents, by fusion by induction, at the temperatures indicated above. The above operations are then followed, particularly the passage of the liquid between two cylindrical rollers turning at high speed, for example at 3000 t/mn approximately (a technique termed hyper-tempering).

The process for making the glasses containing fluorine is also part of the invention.

The invention also has as its object the mixtures of fluorides having the above-indicated compositions, obtained as intermediate products in this preparation process.

The following examples illustrate the invention without in any way limiting it.

EXAMPLE 1

The following fluorides are mixed, in the form of powders in the proportions shown:

| Constituents | % in moles |
|---|---|
| $GaF_3$ | 25 |
| $PbF_2$ | 50 |
| $MnF_2$ | 25 |

The mixture is heated in a glove box in a dry atmosphere to a temperature of 600° to 650° C. After some minutes at this temperature, the melted glass obtained is poured into a brass mold preheated to 200° C. and shaped with a brass roller. A sample is then cut in the shape of a parallelopiped of the following dimensions: 60×10×1 mm.

The glass obtained is colorless.
Its refraction index is: $n_D = 1.638$
Its fusion temperature is 515° C.
Its crystallization temperature is 292° C.

The glasses of the following examples are prepared in similar fashion.

EXAMPLE 2

| Contituents | % in moles |
|---|---|
| $FeF_3$ | 45 |
| $PbF_2$ | 25 |
| KF | 30 |

Color: yellow brown
$n_D$: 1.557
Vitreous transition temperature (Tg) = 265° C.
Crystallization temperature (Tc) = 312° C.
Fusion temperature (Tf) = 570° C.

EXAMPLE 3

| Constituents | % in moles |
|---|---|
| $CrF_3$ | 25 |
| $PbF_2$ | 50 |
| $MnF_2$ | 25 |

Color: green
$n_D$ = 1.663
Tg = 261
Tc = 310
Tf = 570

The following preferred glasses have been prepared, whose compositions and properties are listed in Table I. In this table, the designation of each constituent is preceded by a number which represents the proportion of that constituent in the glass (% in moles).

TABLE I

| Ex. | Composition | | | | Tg °C. | Tc °C. | Tf °C. | Color |
|---|---|---|---|---|---|---|---|---|
| 4  | 70 $PbF_2$ | 30 $GaF_3$ | | | — | 270 | 556 | colorless |
| 5  | 50 $PbF_2$ | 50 $FeF_3$ | | | 270 | 310 | 537 | yellow brown |
| 6  | 30 NaF | 25 $PbF_2$ | 45 $GaF_3$ | | 261 | 286 | 560 | colorless |
| 7  | 30 NaF | 25 $PbF_2$ | 45 $FeF_3$ | | 235 | 282 | 515 | brown red |
| 8  | 30 NaF | 25 $PbF_2$ | 45 $CrF_3$ | | — | 382 | 595 | green |
| 9  | 30 NaF | 25 $PbF_2$ | 45 $VF_3$ | | 250 | 297 | 576 | clear green |
| 10 | 30 LiF | 25 $PbF_2$ | 45 $GaF_3$ | | 225 | 282 | 507 | colorless |
| 11 | 30 KF | 25 $PbF_2$ | 45 $GaF_3$ | | 295 | 329 | 547 | colorless |
| 12 | 30 AgF | 25 $PbF_2$ | 45 $GaF_3$ | | 271 | 314 | 524 | colorless |
| 13 | 30 AgF | 25 $PbF_2$ | 45 $FeF_3$ | | 227 | 272 | 515 | yellow brown |
| 14 | 30 NaF | 25 $CaF_2$ | 45 $GaF_3$ | | 312 | 373 | 600 | colorless |
| 15 | 30 NaF | 25 $CaF_2$ | 45 $FeF_3$ | | 298 | 355 | 612 | brown |
| 16 | 30 NaF | 25 $CaF_2$ | 45 $CrF_3$ | | — | 485 | 770 | green |
| 17 | 30 NaF | 25 $SrF_2$ | 45 $CrF_3$ | | — | 429 | 760 | green |
| 18 | 30 NaF | 25 $SrF_2$ | 45 $VF_3$ | | 311 | 365 | 650 | clear green |
| 19 | 33 $PbF_2$ | 33 $MnF_2$ | 34 $FeF_3$ | | 263 | 311 | 525 | yellow brown |
| 20 | 33 $PbF_2$ | 33 $CuF_2$ | 34 $FeF_3$ | | 239 | 293 | 495 | dark green |
| 21 | 33 $PbF_2$ | 33 $CuF_2$ | 34 $GaF_3$ | | 272 | 333 | 561 | green |
| 22 | 47 $PbF_2$ | 13 $CoF_2$ | 40 $FeF_3$ | | 269 | 309 | 560 | brown |
| 23 | 47 $PbF_2$ | 13 $CoF_2$ | 40 $GaF_3$ | | — | 320 | 595 | violet |
| 24 | 48 $PbF_2$ | 10 $NiF_2$ | 40 $GaF_3$ | | 288 | 308 | 607 | clear yellow |
| 25 | 43 $PbF_2$ | 17 $ZnF_2$ | 40 $GaF_3$ | | 261 | 335 | 560 | colorless |
| 26 | 33 $BaF_2$ | 33 $MnF_2$ | 34 $FeF_3$ | | 300 | 374 | 714 | brown yellow |
| 27 | 43 $CaF_2$ | 17 $CuF_2$ | 40 $GaF_3$ | | 344 | 400 | 736 | green |
| 28 | 45 $CaF_2$ | 15 $CoF_2$ | 45 $GaF_3$ | | — | 397 | 770 | violet |
| 29 | 50 $PbF_2$ | 25 $MnF_2$ | 25 $VF_3$ | | 250 | 291 | 523 | clear green |
| 30 | 50 $PbF_2$ | 25 $ZnF_2$ | 25 $VF_3$ | | — | 288 | 535 | clear green |
| 31 | 50 $PbF_2$ | 25 $MnF_2$ | 25 $GaF_3$ | | 222 | 283 | 552 | colorless |
| 32 | 40 $PbF_2$ | 25 $MnF_2$ | 25 $FeF_3$ | 10 $PbCl_2$ | 240 | 287 | 500 | yellow brown |
| 33 | 50 $PbF_2$ | 25 $MnF_2$ | 25 $TiOF_2$ | | 238 | 291 | 525 | brown |
| 34 | 22 $PbF_2$ | 33 $MnF_2$ | 33 $FeF_3$ | 11 $BiF_3$ | — | 308 | 470 | yellow |
| 35 | 36 $PbF_2$ | 24 $MnF_2$ | 10 $NdF_3$ | 30 $GaF_3$ | — | 310 | 535 | pale rose |
| 36 | 20 $BaF_2$ | 35 $MnF_2$ | 45 $FeF_3$ | | — | 392 | 710 | yellow brown |

TABLE I-continued

| Ex. | Composition | | | Tg °C. | Tc °C. | Tf °C. | Color |
|---|---|---|---|---|---|---|---|
| 37 | 30 NaF | 25 CdF$_2$ | 45 VF$_3$ | — | — | — | green |
| 38 | 50 CdF$_2$ | 50 FeF$_3$ | | — | 297 | 665 | yellow brown |
| 39 | 50 CaF$_2$ | 50 FeF$_3$ | | — | — | 790 | yellow brown |
| 40 | 46 PbF$_2$ | 22 ZnF$_2$ | 32 InF$_3$ | 220 | 250 | 485 | colorless |
| 41 | 20 BaF$_2$ | 35 MnF$_2$ | 45 HoF$_3$ | — | 395 | 740 | clear beige |

TABLE OF EQUIVALENT WEIGHTS

| Example No. | Constituents | % By Weight |
|---|---|---|
| 1 | GaF$_3$ | 17.9 |
|   | PbF$_2$ | 69 |
|   | MnF$_2$ | 13.1 |
| 2 | FeF$_3$ | 39.2 |
|   | PbF$_2$ | 47.3 |
|   | KF | 13.5 |
| 3 | CrF$_3$ | 15.8 |
|   | PbF$_2$ | 70.8 |
|   | MnF$_2$ | 13.4 |
| 4 | PbF$_2$ | 73 |
|   | GaF$_3$ | 27 |
| 5 | PbF$_2$ | 68.5 |
|   | FeF$_3$ | 31.5 |
| 6 | NaF | 9.6 |
|   | PbF$_2$ | 46.8 |
|   | GaF$_3$ | 43.6 |
| 7 | NaF | 10.1 |
|   | PbF$_2$ | 49.1 |
|   | FeF$_3$ | 40.8 |
| 8 | NaF | 10.3 |
|   | PbF$_2$ | 49.8 |
|   | CrF$_3$ | 39.9 |
| 9 | NaF | 10.3 |
|   | PbF$_2$ | 50 |
|   | VF$_3$ | 39.7 |
| 10 | LiF | 6.2 |
|   | PbF$_2$ | 48.6 |
|   | GaF$_3$ | 45.2 |
| 11 | KF | 12.8 |
|   | PbF$_2$ | 45.1 |
|   | GaF$_3$ | 42 |
| 12 | AgF | 24.4 |
|   | PbF$_2$ | 39.2 |
|   | GaF$_3$ | 36.4 |
| 13 | AgF | 25.4 |
|   | PbF$_2$ | 40.8 |
|   | FeF$_3$ | 33.8 |
| 14 | NaF | 14.1 |
|   | CaF$_2$ | 21.9 |
|   | GaF$_3$ | 64 |
| 15 | NaF | 15.2 |
|   | CaF$_2$ | 23.5 |
|   | FeF$_3$ | 61.3 |
| 16 | NaF | 15.5 |
|   | CaF$_2$ | 24 |
|   | CrF$_3$ | 60.5 |
| 17 | NaF | 13.5 |
|   | SrF$_2$ | 33.7 |
|   | CrF$_3$ | 52.7 |
| 18 | NaF | 13.6 |
|   | SrF$_2$ | 33.9 |
|   | VF$_3$ | 52.5 |
| 19 | PbF$_2$ | 53.9 |
|   | MnF$_2$ | 20.5 |
|   | FeF$_3$ | 25.6 |
| 20 | PbF$_2$ | 52.9 |
|   | CuF$_2$ | 21.9 |
|   | FeF$_3$ | 25.1 |
| 21 | PbF$_2$ | 51.4 |
|   | CuF$_2$ | 21.3 |
|   | GaF$_3$ | 27.4 |
| 22 | PbF$_2$ | 66.6 |
|   | CoF$_2$ | 7.3 |
|   | FeF$_3$ | 26.1 |
| 23 | PbF$_2$ | 64.5 |
|   | CoF$_2$ | 7.1 |
|   | GaF$_3$ | 28.4 |
| 24 | PbF$_2$ | 66.1 |
|   | NiF$_2$ | 5.4 |
|   | GaF$_3$ | 28.5 |
| 25 | PbF$_2$ | 60.7 |
|   | ZnF$_2$ | 10.1 |
|   | GaF$_3$ | 29.2 |
| 26 | BaF$_2$ | 45.6 |
|   | MnF$_2$ | 24.2 |
|   | FeF$_3$ | 30.2 |
| 27 | CaF$_2$ | 33.1 |
|   | CuF$_2$ | 17 |
|   | GaF$_3$ | 49.9 |
| 28 | CaF$_2$ | 32.9 |
|   | CoF$_2$ | 13.6 |
|   | GaF$_3$ | 53.4 |
| 29 | PbF$_2$ | 70.9 |
|   | MnF$_2$ | 13.5 |
|   | VF$_3$ | 15.6 |
| 30 | PbF$_2$ | 69.9 |
|   | ZnF$_2$ | 14.7 |
|   | VF$_3$ | 15.4 |
| 31 | PbF$_2$ | 69 |
|   | MnF$_2$ | 13.1 |
|   | GaF$_3$ | 17.9 |
| 32 | PbF$_2$ | 55.3 |
|   | MnF$_2$ | 13.1 |
|   | FeF$_3$ | 15.9 |
|   | PbCl$_2$ | 15.7 |
| 33 | PbF$_2$ | 71.5 |
|   | MnF$_2$ | 13.6 |
|   | TiOF$_2$ | 14.9 |
| 34 | PbF$_2$ | 41 |
|   | MnF$_2$ | 23.4 |
|   | FeF$_3$ | 28.4 |
|   | BiF$_3$ | 7.2 |
| 35 | PbF$_2$ | 52.3 |
|   | MnF$_2$ | 13.2 |
|   | NdF$_3$ | 11.9 |
|   | GaF$_3$ | 22.5 |
| 36 | BaF$_2$ | 29.6 |
|   | MnF$_2$ | 27.5 |
|   | FeF$_3$ | 42.9 |
| 37 | NaF | 12.8 |
|   | CdF$_2$ | 38 |
|   | VF$_3$ | 49.2 |
| 38 | CdF$_2$ | 57.1 |
|   | FeF$_3$ | 42.9 |
| 39 | CaF$_2$ | 40.9 |
|   | FeF$_3$ | 59.1 |
| 40 | PbF$_2$ | 59.2 |
|   | ZnF$_2$ | 11.9 |
|   | InF$_3$ | 38.9 |
| 41 | BaF$_2$ | 20.9 |
|   | MnF$_3$ | 19.4 |
|   | HoF$_3$ | 59.6 |

We claim:
1. Glasses containing fluorine characterized by the fact that they contain
   (1) at least 25% of a fluoride or a mixture of fluorides having the formula MX(X$_1$)$_2$ as a network former in which
      (a) X and X$_1$ each represent a fluorine atom and M represents a metal chosen from the group consisting of gallium, iron, chromium, vanadium, indium, and the rare earths, or

(b) X represents an oxygen atom, $X_1$ represents a fluorine atom, and M represents a titanium atom, said glasses being devoid of hydrofluoric acid and (2) at least one fluoride having the formula $M_{II}F_2$, $M_{II}$ being a devalent metal chosen from the group consisting of lead, barium, calcium, cadmium, and strontium, said at least one fluoride being present in an amount up to 75% in moles, said glasses containing no more than 5% in moles of alkaline-earth fluorophosphates and no more than 10% in moles of $ZrF_4$ and/or $HfF_4$.

2. Glasses according to claim 1 which include at least one fluoride of a rare earth selected from the group consisting of neodymium, gadolinium, europium, holmium, praesodymium and erbium.

3. Glasses according to claim 2 which also contain at least one fluoride of the formula $MtF_2$, Mt being a 3d transition metal.

4. Glasses according to claim 1 which also contain at least one fluoride of the formula $MtF_2$, Mt being a 3d transition metal.

5. Glasses according to claim 4 wherein Mt is selected from the group consisting of cobalt, copper, manganese, iron, nickel, chromium, and zinc.

6. Glasses according to claim 4 which contain up to 40% in moles of a fluoride or a mixture of fluorides of the formula $MtF_2$.

7. Glasses according to either claim 1 or 3 which contain at least one fluoride of the formula $M_IF$, $M_I$ being chosen from the group consisting of the alkaline metals and silver.

8. Glasses according to claim 7 which contain up to 50% in moles of a fluoride or a mixture of fluorides $M_IF$.

9. Glasses according to claim 1 which contain as adjuvants up to 10% in moles of halides, other than fluorides, of the $M_I$ metals selected from the group consisting of alkaline metals and silver or $M_{II}$ metals as defined in claim 28.

10. Glasses according to claim 9 which contain up to 10% in moles of aluminum trifluoride.

11. Glasses according to claim 9 which contain no aluminum trifluoride.

12. Glasses according to any one of claims 9–11 which contain up to 22% in moles of bismuth trifluoride.

13. Glasses according to claim 9 wherein said halide is $PbCl_2$.

14. Glasses according to claim 1 which contain 25 to 30% in moles of a fluoride or a mixture of fluorides $MX(X_1)_2$ the rest consisting of a fluoride or a mixture of fluorides of the formula $M_{II}F_2$.

15. Glasses according to claim 1 which contain 48 to 55% in moles of a fluoride or a mixture of fluorides $MX(X_1)_2$ the rest consisting of a fluoride or a mixture of fluorides $M_{II}F_2$.

16. Glasses according to claims 4, 5, or 3 which contain 25 to 50% in moles of a fluoride or a mixture of fluorides $MX(X_1)_2$, 20 to 60% in moles of a fluoride or a mixture of fluorides $M_{II}F_2$, the rest consisting of a fluoride or a mixture of fluorides having the formula $MtF_2$, this latter being present in an amount of less than 40% in moles.

17. Glasses according to claim 7 which contain 37 to 50% in moles of a fluoride or a mixture of fluorides $MX(X_1)_2$ 10 to 55% in moles of a fluoride or a mixture of fluorides $M_{II}F_2$, the rest consisting of a fluoride or a mixture of fluorides $M_IF$.

18. Glasses according to claim 7 which contain 25 to 50% in moles of a fluoride or a mixture of fluorides $MX(X_1)_2$, 10 to 60% of a fluoride or a mixture of fluorides $M_{II}F_2$, up to 50% in moles of a fluoride or a mixture of fluorides $M_IF$ the rest consisting of a fluoride or a mixture of fluorides $MtF_2$ present at the amount of up to 40% in moles.

19. Glasses according to claim 1 wherein M represents a metal chosen from the group consisting of iron, chromium, vanadium, the rare earths, and titanium.

20. Glasses according to claim 1 which are free of alkaline earth fluorophosphates.

21. Glasses according to claim 1 which do not contain any $ZrF_4$ or $HfF_4$.

22. Glasses according to claim 1 which do not contain any beryllium fluoride or magnesium fluoride.

23. Glasses according to claim 1 which do not contain any fluorophosphates.

* * * * *